United States Patent Office 3,360,438
Patented Dec. 26, 1967

3,360,438
RAPID SEPARATION OF SCHISTOSOME OVA FROM TISSUE BY DIGESTION WITH PINGUINAIN
Efrain Toro Goyco, Rio Piedras, and Eliseo Rivera Collazo, Hato Rey, Puerto Rico, assignors to the United States of America as represented by the Administrator of Veterans Affairs and/or the Secretary of the Army
No Drawing. Filed Sept. 22, 1964, Ser. No. 398,456
7 Claims. (Cl. 195—2)

This invention may be used by or for the United States Government for governmental purposes without the payment to us of any royalty thereon.

This invention relates to the recovery of schistosome ova from animal tissues and more particularly to the use of the proteolytic enzyme, pinguinain, to digest the animal tissue containing the ova.

Schistosoma mansoni is a tropical parasite that infects man and other animals. It is known that serum of humans and experimental animals infected with Schistosoma mansoni causes a precipitate to form around schistosome ova exposed to such serum. This phenomenon provides a reliable diagnosis of the disease, is known as the circumoval precipitin test and is described in the Journal of Infectious Diseases, vol. 95, pages 86–91 (1954).

As a result of the discovery of this test much experimental work has been carried out to develop a simple, inexpensive method of recovering the ova from the animal tissue in which they occur. S. R. Smithers in the Transactions of the Royal Society of Tropical Medicine and Hygiene, vol. 54, page 68 (1960) has reported a process in which tissue containing the ova is digested with two proteolytic enzymes, trypsin and pepsin. This method requires an incubation period of over 5 hours. Further both enzyme preparations are expensive, show peptide specificity and have different pH optima requiring incubation in different buffers to achieve maximum hydrolysis.

Recently Browne and Thomas disclosed, in the Journal of Parasitology, vol. 49, page 371 (1963), a method for obtaining viable ova from hamster livers which includes the step of digesting the liver tissue with trypsin. The method is quite complex and requires the use of special equipment.

As opposed to the prior art methods of recovery the schistosome ova, we have invented a simple method of recovering the schistosome ova that requires only one digestion step with the proteolytic enzyme pinguinain and can be carried out in ordinary laboratory apparatus. The ova recovered yield a positive circumoval precipitation reaction and this reaction is exhibited after a shorter incubation period than with ova recovered by the prior art processes.

It is accordingly an object of this invention to provide an improved method of recovering schistosome ova from animal tissue.

It is a further object of this invention to provide a process for recovering schistosome ova which involves only one digestion step and does not require any special apparatus.

It is another object of this invention to provide a method of recovering schistosome ova that possess a higher reaction rate in the circumoval precipitin test.

It is an additional object of this invention to provide an enzymatic method of recovering schistosome ova from animal tissue using the proteolytic enzyme, pinguinain.

These and other objects of this invention will be apparent from the following disclosure.

Mice infected with Schistosoma mansoni may be used as the source of animal tissue containing the ova to be recovered.

A method for infecting the mice is described in an article by Ritchie and Berríos-Durán in the Journal of Parasitology, vol. 47, page 363 (1961). The infected mice are killed and livers and intestines are removed. The average weight of the livers is 3 grams and the average weight of washed intestines is 2.5 grams. The livers or intestines are placed together with approximately 2 ml./g. of a buffer to maintain a pH range of from 4 to 7 and homogenized. Since liver appears to be less easily digested than intestine the pH optimum with respect thereto is 4, which is close to the pH optimum of pinguinain. With intestine the pH is not that critical.

The homogenized tissue is then mixed with from 5 to 10 mg. of pinguinain per gram of tissue, placed in a water bath maintained at a constant temperature of about 37° C. and agitated until digestion is complete at which time the ova have sedimented to the bottom of the container. After digestion the mixture is passed through a filter that passes the ova but retains most of the debris. The filtrate is layered over a higher density liquid such as 8 percent (wt./vol.) aqueous NaCl solution and centrifuged. The ova sedimented to the bottom. For additional purity the NaCl solution is decanted the ova suspended in a low density NaCl solution which is then layered over a higher density solution and centrifuged. The ova sediment to the bottom and are completely free of debris.

Pinguinain is a proteolytic enzyme dependent on its sulfhydril group for enzymatic activity. It shows a broad peptide bond specificity. It occurs in appreciable amounts in the fruits of Bromelia pinguin L. The enzyme used herein is obtained by crushing the fruit of Bromelia pinguin and pressing the juice through a filter to obtain a liquid rich in the enzyme and relatively free of solid foreign matter. The juice is then dried to yield a powder. The enzyme may of course be additionally purified but this is not essential to the process, it being only necessary that sufficient enzyme be used to completely digest the protein of the tissue containing the ova. In addition the juice itself may be used directly without the necessity of drying.

The following examples illustrate specific embodiments of the invention.

Example 1

Infected mice livers were mixed with 2 ml. of 0.1 M acetate buffer, pH 4, per gram of liver in a diagonally fluted pyrex flask and were homogenized with a Virtis 25 homogenizer. The equivalent of 2 livers were transferred to a 25-ml. Erlenmeyer flask and mixed with 60 mg. of crude pinguinain powder. The flask was placed in a water bath maintained at 37° C. and agitated for three hours. Undigested fatty material adhered to the walls of the flask and the free ova sedimented to the bottom. The contents of the flask were passed through a fine mesh (15/cm.$^2$). A 6 ml. quantity of the filtrate was then layered over 8 ml. of an 8 percent aqueous sodium chloride solution (wt./vol.) in a 15 ml. graduated tube and centrifuged for 2 minutes at 1000 r.p.m. The ova sedimented to the bottom. Debris remaining in the upper layer was removed with suction and the remaining sodium chloride solution decanted. The sedimented ova were suspended in a 0.9% NaCl solution, layered over 8 ml. of 8% NaCl and again centrifuged. The sedimented ova were free of debris and between 2000 and 3000 eggs per gram of liver were recovered.

Example 2

The procedure of Example 1 was followed with intestines of infected mice. The amount of pinguinain used with the equivalent of two intestine was 25 mg. The procedure produced a yield of from 8000 to 10,000 ova per gram of intestine.

The whole procedure after incubation took about 15 minutes. The ova recovered according to the process of Examples 1 and 2 appear, under the microscope, to be physically intact but were immotile and would not hatch. Positive circumoval reaction was observed when the fresh or lyophilized ova were incubated with sera from patients suffering from schistosomiasis. Further, the ova obtained according to this process yield a positive circumoval reaction after only two hours of incubation with sera from infected subjects whereas the ova obtained by prior art methods requires a 24 hour incubation period for reliable result. In addition whereas a maximum of 20% of the ova obtained by prior art sedimentation and decantation methods yield positive reactions, 40% of the ova obtained by the instant process yield positive reactions thereby making a more reliable test.

The invention has been disclosed with respect to specific embodiments thereof, however, the invention is not limited to the specific details thereof. Many modifications are within the scope of the invention which is defined by the following claims.

We claim:
1. In a process for the separation of schistosome ova from animal tissue containing said ova by digestion of the animal tissue with a proteolytic enzyme, the improvement which comprises digesting said animal tissue with pinguinain.

2. A process for recovering schistosome ova from animal tissue containing said ova comprising the steps of:
 (a) digesting animal tissue containing schistosome ova with pinguinain, and
 (b) separating the schistosome ova from the digested tissue.

3. A process for recovering schistosome ova from animal tissue containing said ova which comprises the steps of:
 (a) homogenizing animal tissue containing said ova with a buffer having a pH range of from 4 to 7,
 (b) digesting the homogenized tissue with pinguinain,
 (c) separating the digested material and the ova from undigested material, and
 (d) separating the schistosome ova from the digest.

4. The process as in claim 3 wherein said digestion step is carried out at 37° C. with agitation for a period of three hours and the pinguinain is present in an amount of from 5 to 10 mg. per gram of animal tissue.

5. The process as in claim 4 wherein the separation of the ova and digested material from the undigested material comprises filtering the digest through $15/cm.^2$ mesh filter and retaining the filtrate.

6. The process as in claim 5 wherein the separation of the ova from the digested material comprises the steps of:
 (a) layering the filtrate over a higher density liquid,
 (b) centrifuging the layered fluids,
 (c) removing debris from the upper layer,
 (d) decanting said liquid from the ova,
 (e) suspending said ova in a liquid,
 (f) layering said liquid over a higher density liquid, and
 (g) centrifuging said layered liquid.

7. The process as in claim 6 wherein said liquid is 0.9% wt./vol. aqueous NaCl solution and said higher density liquid is 8% wt./vol. aqueous NaCl.

No references cited.

LIONEL M. SHAPIRO, *Primary Examiner.*